United States Patent

[11] 3,603,018

| [72] | Inventor | Elmer W. Mercer<br>1212 San Luis Drive, Orlando, Fla. 32807 |
|---|---|---|
| [21] | Appl. No. | 867,518 |
| [22] | Filed | Oct. 20, 1969 |
| [45] | Patented | Sept. 7, 1971 |

[54] FISHING ROD ACCESSORY
8 Claims, 9 Drawing Figs.

[52] U.S. Cl. .................................................. 43/19.2,
242/84.2
[51] Int. Cl. .................................................. A01k 87/00
[50] Field of Search............................................ 43/19.2, 24,
25, 15; 242/84.1, 84.2, 84.21, 84.5, 84.53

[56] References Cited
UNITED STATES PATENTS

| 2,593,749 | 4/1952 | Goldberg................... | 242/84.2 |
| 2,861,378 | 11/1958 | Bell............................ | 43/19.2 |
| 2,906,049 | 9/1959 | Shirk.......................... | 43/15 |
| 3,031,790 | 5/1962 | Duryea....................... | 43/19.2 |
| 3,309,810 | 3/1967 | Hannon...................... | 43/19.2 |
| 3,370,806 | 2/1968 | Odom......................... | 242/84.2 |

*Primary Examiner*—Aldrich F. Medbery
*Attorney*—Roger L. Martin

ABSTRACT: A spring-loaded device used in imparting simulated live bait movement to a fishing lure has a finger mounted for movement between an inoperative and an operative position. At the operative position, a hook end portion of the finger is located in the path of the fishline movement between the reel end eyelet of the fishing rod and the face of an attached open face spinning reel to momentarily catch and release the line during each revolution of the reel flier as the line is reeled in. A clamp used in detachably mounting the device on the fishing rod in one embodiment is adjustable to vary the location of the hook in the path of line movement and thus to vary the action imparted to the fishing line and attached lure during use of the accessory.

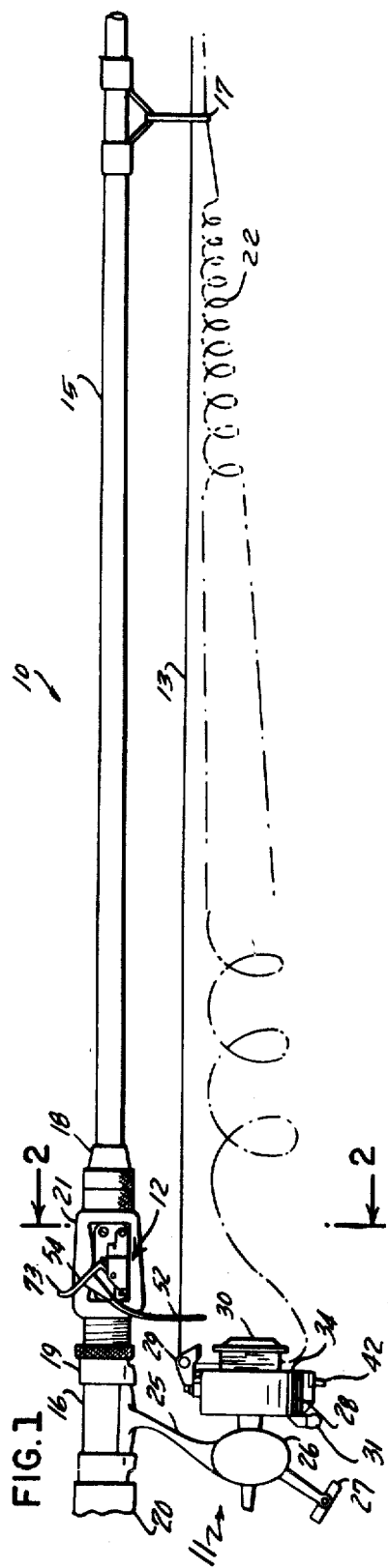
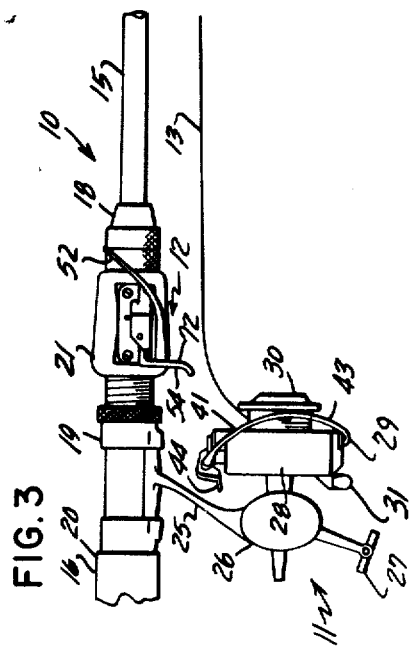
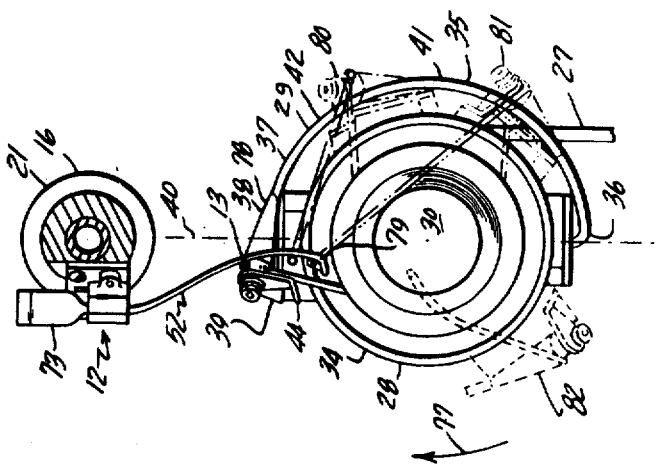
FIG. 1
FIG. 3
FIG. 2
ELMER W. MERCER
INVENTOR.
BY Roger L. Martin
Attorney PATENTED SEP 7 1971
3,603,018
SHEET 2 OF 2
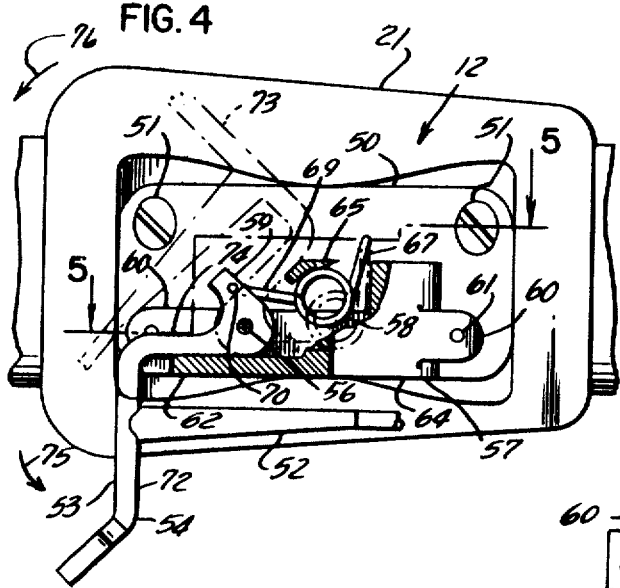
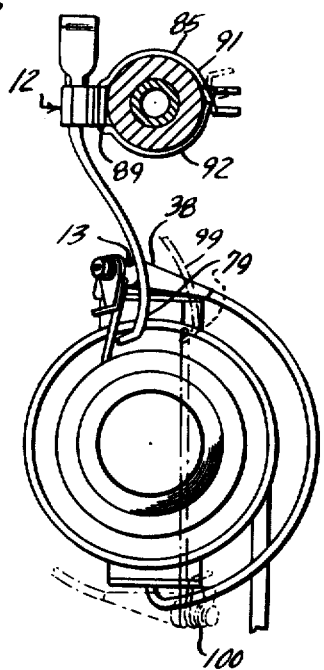
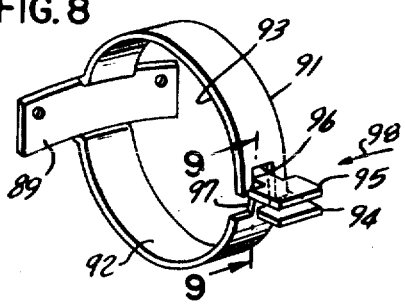
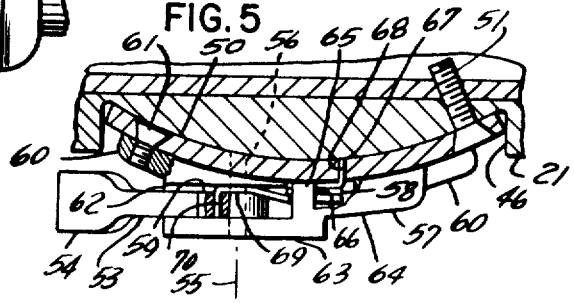
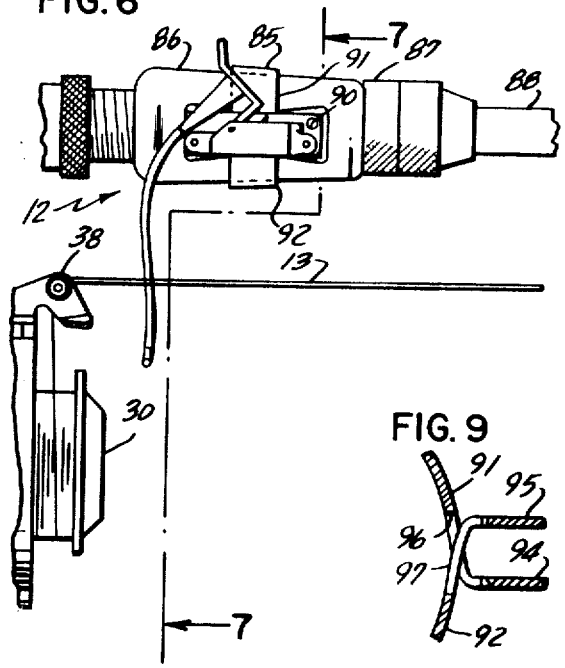
ELMER W. MERCER
INVENTOR.
BY Roger L. Martin
Attorney

FISHING ROD ACCESSORY

The invention relates to a fishing rod accessory, and more particularly to a device which can be used with an open face spinning reel equipped fishing rod to impart a simulated live bait movement to a fishing lure while the fish line is being reeled in.

In a free environment, live bait swim in spurts with sudden and brief bursts of effort and intermittent lapses or pauses in their forward movement. While reeling in a previously cast fishing line, it is the usual practice for the sportsman to try and simulate such movement by imparting an action to the rod which alternately tightens and slackens the line so as to vary the bait movement at the hook end of the line.

Although devices in the nature of fishing rod accessories that function in the manner such as to simulate the live bait movement have been proposed in the past, none of the devices appear to be available on the market and it is believed that among the reasons for such unavailability are the high costs of their manufacture, their bulkiness which interferes with the storage of the fishing rod when the devices remain attached to the rod or which when detached are incapable of being suitably housed in the conventional bait boxes, and the need in most cases for separate manipulation of the device in order to accomplish the results and which consequently interferes with the reel manipulation by the fisherman.

The invention has to do with a device which is designed specifically for use with an open face spinning reel equipped fishing rod. As the line is being reeled in on rods which are thus equipped the line traverses a generally helical conical path of movement between the reel end eyelet and the bail of the spinning rod and in accord with the invention a device is provided for attachment to the rod and which includes a finger element which by manipulation by the sportsman can be moved into and out of the path of movement of the line and which in its operating position in the path of movement of the line serves to momentarily catch the line during each revolution of the bail carrying flier of the reel and in a manner such as to momentarily accelerate the pay in of the line before the line is released to then permit the reel to take up the slack in the fishline. Although various means can be provided for mounting the finger on the rod so that it can be manipulated between an operative and inoperative position, one aspect of the invention has to do with the mounting of the finger in a manner such that it can be manipulated to pivot into and out of its operating position about an axis which is generally transverse to that of the fishing rod. In accord with this aspect, the device is mounted in front of the reel and by virtue of the arrangement the sportsman can not only easily manipulate the device during the process of fishing but the finger is capable of assuming a position at which it does not interfere with the disassembly and subsequent storage of the rod in the storage containers provided for example with fishing rods of the type that can be disassembled for convenient storage and handling. In accord with another aspect of the invention a spring is provided for biasing the finger into its respective positions so as to maintain the finger in the selected operative or inoperative position chosen by the sportsman.

Yet another aspect of the invention has to do with the mounting of the finger on a lever member of the device which is conveniently manipulatable by the sportsman and arranged to cooperate in an overcenter arrangement with the spring in maintaining the finger in the operative or inoperative position selected.

Still another aspect of the invention has to do with a means for mounting the device on a fishing rod and in a manner such that the finger can be adjusted in its operating position to vary the period of line interruption as will be subsequently shown.

Other aspects of the invention will be apparent from the following detailed description that primarily relate to the embodiment shown in the drawings and wherein:

FIG. 1 shows a fragment of a fishing rod which is equipped with an open face spinning reel and a device embodying the principles of the invention, the device being seen in its operative position;

FIG. 2 is an enlarged transverse sectional view taken generally along the lines 2—2 of FIG. 1;

FIG. 3 is a view similar to FIG. 1 but showing the arrangement when the finger is in its inoperative position;

FIG. 4 is an enlarged side elevational view of the device seen in FIGS. 1 and 3;

FIG. 5 is a section view taken generally along the lines 5—5 of FIG. 4;

FIG. 6 shows a fragment in side elevation of an open face spinning reel equipped fishing rod and wherein an adjustable clamp is used to mount the device on the rod;

FIG. 7 is a transverse section generally along the lines 7—7 of FIG. 6;

FIG. 8 is a perspective view of the clamp; and

FIG. 9 is an enlarged fragment of the clamp seen in FIG. 8 as seen along the lines 9—9 therein.

Reference is now made to the drawings and more particularly to the embodiment of the invention shown in FIGS. 1 through 5 inclusive and wherein a conventional fishing rod is designated at 10 and shown as equipped with a conventional open face spinning reel 11 and a rod accessory embodying the principles of the invention and which is shown in the form of a device 12 that includes parts which are capable of cooperating with the reel 11 in imparting a simulated live bait movement to a lure attached to the fishline during the operation of the spinning reel 11 to pay in the line 13.

The fishing rod may be of any conventional design but is shown in the illustrations as including an elongated tubular component or member 15, a handle 16 which is attached at one end of the member 15, and suitable line guide eyelets such as the reel end eyelet designated at 17. The handle 16 in this instance has a split sleeve clamp member 18 for releasably securing the handle 16 to the end of the rod 15, a releasable reel fastening device 19 and spaced handgrips 20 and 21 which are respectively located in the back and front of the reel fastening device 19, as seen in FIGS. 1 and 3.

Various different types of open face spinning reels may be used in conjunction with the device 12 and reels of this type have a line pickup mechanism which is rotated when the line is being reeled in and which winds the line on a nonrotating drum or spool in a manner such that between the reel end eyelet of the rod and the pickup mechanism the fishline generally traverses a helical conical path which is schematically illustrated at 22 in FIG. 1.

The spinning reel 11 shown in the drawings includes a mounting member or support 25 which is fastened to the rod 10 by device 19. The gear mechanism 26 of reel 11 is suitably mounted on the support and is provided with a crank 27 which, of course, is manipulated by the sportsman when the line 13 is being reeled in. The drum or spool for line 13 is designated at 30 and the line pickup mechanism 29 of reel 11 is mounted on a cylindrical member 28 which is geared by mechanism 26 for rotation about the axis of the drum 30 when the crank is suitably manipulated by the sportsman.

The pickup mechanism 29 of the reel illustrated includes an arcuate member or bail 35 which is pivotally mounted on the flier 28 at one end 36 and at the other end 37 is fastened to a suitable line distributor or guide 38. This distributor 38 is carried at the outer end of a spring-biased arm 39 which is pivotally mounted on the flier 28 for pivotal movement about an axis 40 which is common to that at the bail end 36. The pivot arm component 39 of mechanism 29 is biased by a spring (not shown) so that the line-catching assembly 41, composed of components 35, 38 and 39 of mechanism 29, normally assumes the operating position 42, seen in FIGS. 1 and 2.

As is well known, assembly 41 can be manipulated to pivot about the axis 40 and against the biasing force operating on the assembly so as to assume the inoperative position 43 shown in FIG. 3. In this respect, the pickup mechanism 29 is provided with a suitable spring biased latch (not shown) which engages the arm 39 when the assembly 41 assumes its inoperative position 43 to retain the assembly in this position against the urgings of the force biasing the assembly into its operating position 42. Arm 39 has a protuberance 44 which is arranged to encounter a fixed lug 31 when the flier or cylindrical member 28 is rotated to reel line 13 onto the drum 30, and this encounter with the lug releases the latch to permit the assembly 41 to swing about the axis 40 and into its operating position 42. As this happens in the normal operation of the pickup mechanism, the line 13 is caught by the bail and drawn onto the guide or distributor component 38 as the bail sweeps across the open face 34 of the reel 11.

The component parts of device 12 are best seen by reference to FIGS. 4 and 5 and wherein it will be seen that the device includes an arcuate mounting plate 50 which is mounted in a side recess 46 in grip 21 by a pair of screw-type fasteners 51 that provide a means for attaching the device to the fishing rod. The finger 52 of device 12 is fixed to one arm 53 of a lever component 54 of the device and the lever 54 is engaged by and mounted for pivotal movement about the axis 55 of a pivot pin designated at 56. This axis 55 when the device is attached to the rod is generally transverse to the longitudinal axis of the rod 10.

Device 12 has a cast metal piece 57 that serves as a housing for a spring component 58 of the device as well as for the other arm 59 of lever 54. As seen in FIGS. 4 and 5, the cast metal piece 57 has opposite end lugs 60 and is secured to the mounting plate 50 by means of screws designated at 61. The shape of the housing forming piece 57 is such as to provide a ledge 62 and a sidewall 63 at one end of the piece and whereat the lever arm 59 is housed between the plate 50 and wall portion 63.

Plate 50 and wall 63 are engaged by the pin 56 and have aligned holes in which the pivot pin 56 is received in the assembly of the device. Spring 58 is a preformed coiled spring which is connected to plate 50 and arm 59 of lever 54 and is housed between plate 50 and an inset sidewall forming portion 64 of piece 57. At this end of the housing piece 57, the piece has a spring covering upper ledge 65 which is provided with an opening 66 through which one end 67 of the spring projects in the assembled device. This end 67 of the spring is bent at its extremity and is received in a hole 68 in plate 50 as seen in the drawings. The other end 69 of the preformed spring is engaged in a hole 70 that is offset from pin axis 55 and located in arm 59 as seen in FIGS. 4 and 5. The arrangement of wall 63 with respect to plate 50 is such as to provide an opening 71 which will accommodate pivotal movement of the lever 54 between that designated at 72 and at which the finger is in the inoperative position and that designated at 73 whereat the finger 52 is in its operative position. As seen in FIG. 4, lever arm 54 is bent at right angles so that an inner portion 74 of arm 53 rests on ledge 62 when the finger is in the inoperative position. Under such circumstances, spring 58 by virtue of its connection with plate 50 and lever arm 59 biases the lever in the direction of arrow 75 and thus serves to yieldably retain the finger 52 in its inoperative position.

To move the finger into its operative position lever 54 is pivotally manipulated by the fisherman in the direction of arrow 76 against the urgings of spring 58 and, as the arm 59 passes the centerline between hole 68 and the pivot arm, the spring biases the lever into its other position, designated at 73. The spring is accordingly arranged so that it will yieldably retain the lever in either of its positions and thus also yieldably retain the finger in either of its positions. The lower ledge 62 is encountered by the inner portion 74 of arm 53 and thus serves as a stop for the lever when the finger reaches its inoperative position. The upper ledge 65 on the other hand is encountered by the inner portion 74 of arm 53 and serves as a stop when the finger reaches its operative position.

The manner in which reel 11 and device 12 cooperate is best understood by reference to FIGS. 1, 2 and 3. To cast the line 13, the line-catching assembly 41, as is customary, is placed in its inoperative position 43 and the finger component 52 of device 12 is also placed in its inoperative position through the manipulation of lever 54 into position 72. Under these circumstances, the hook end portion 79 is offset from the normal path of movement of line 13 and as shown in FIG. 3, the line 13 and attached lure may be cast in a manner such as to pay out the line and to cause it to unwind from drum 30 in the usual manner.

Next in the course of events, and to reel in the line and simultaneously impart a simulated live bait movement to the lure, lever 54 is manipulated into the position designated at 73 so as to place the finger 52 in its operative position at which the hook is located in the normal line path of movement. Thereafter, crank 27 can be manipulated to rotate the flier and catch assembly 41 in the direction of arrow 77. This causes the protuberance 44 of pivot arm 39 to encounter lugs 31 and thereby release the latch that retains the assembly 41 in its inoperative position 43. When this happens, the catch assembly 41 swings across the face of the reel about the axis 40 and into its operative position designated at 42. In sweeping across the face of the reel, the bail 35 encounters line 13, and with the continuation of the rotary movement of the assembly 41 in the direction of arrow 77, the line 13 is drawn onto the line distributor 38 and starts to wind onto drum 30. Thereafter in the normal course of events, and as the flier continues to rotate in the direction of arrow 77, the distributor reaches the position designated at 78 in FIG. 2 and draws the line into contact with the hooked end portion 70 of finger 52. Thereafter as the distributor rotates and passes successively through the positions designated at 80 and 81, the line 13 is retained on hook 79 and caused to pay in at a more accelerated rate than if the line were free to traverse its normal helical conical path. Once the distributor reaches the position designated at 82 the line 13 is drawn off the hook and assumes a slackened state until such time as the slack is taken up by the continued movement of the distributor in the direction of arrow 77. Thereafter and with each revolution of the flier and line assembly 41 carried thereby, line 13 is caught and released by the hook 79 of the finger 52 so that with each revolution the attached bait is caused to rapidly advance while the line is caught by the hook and to pause in its forward movement while the slack that results when the line is released by the hook is taken up by the reel.

Reference is now made to the embodiment of the invention shown in FIGS. 6 through 9 inclusive and wherein the device 12 is shown as mounted on a clamp 85 that is used in attaching the accessory on a handle grip 86 of the fishing rod 88 depicted in the figures. The clamp 85 has an arcuate plate 89 and the mounting plate 50 of device 12 is secured to plate 89 by means of fasteners designated at 90.

Plate 89 in this instance is formed integral with two arcuate portions 91 and 92 of the clamp and which are made of resilient material, such as spring steel. Portions 91 and 92 of clamp 85 embrace the grip when the accessory is mounted on the fishing rod 88 and in the unstrained or static state of the clamp, the arcuate portions 91 and 92 define a circular opening which has a diameter less than that of the grip so that when the clamp embraces the grip, portions 91 and 92 are strained and biased to positively clamp the grip in the provided opening 93.

Clamp portions 91 and 92 have radially projecting finger pieces 94 and 95 respectively and which can be pressed together by the fisherman to release the grip of the clamp on the handle grip 86 for adjusting the location of the device. In this respect, the arcuate portion 91 is provided with an L-shaped cutout 96 at the base of finger piece 94 and portion 92 has a reduced portion 97 at the base of its finger 95 and which normally fits in the cutout 96. To remove the accessory from fishing rod 88, the finger pieces 94 and 95 are pressed together and finger piece 95 withdrawn from the cutout in the direction of arrow 98 so that it can assume an underlying position with respect to finger piece 94. Under such circumstances, the arcuate portions 91 and 92 can be spread apart to withdraw the clamp 85 and the attached device 12 from the handle grip 86.

The clamp device 85 provides a detachable means for mounting the device on the fishing rod and also permits the adjustment of the hook location at its operative position so that the angler can regulate the period of line contact with hook portion 79. Thus as seen in FIG. 7, the device 12 can be moved rotatively about the axis of the fishing rod to adjust the location of the hook in relationship to the line 13. This is done by simply pressing finger pieces 94 and 95 together to initially release the grip of the arcuate portions 91 and 92 on the handle grip 86 and thereafter rotating the clamp 85 about the axis of the rod so as to move the hook portion to the new position selected such as at 99. Release of the finger pieces will then permit the clamp to again grasp the grip 86 to retain the device in the selected position.

As compared to the solid line position for the finger shown in FIG. 7, placement of the finger in the position indicated at 99 reduces the length of time of contact between the line 13 and hook portion 79 and the line is released from the hook at approximately the position shown for the distributor at 100. This, of course, results in a shorter period of accelerated movement of the line-attached lure and a longer pause in lure movement with each revolution of the flier as compared to when the finger is in the solid line position shown in FIG. 7.

While only certain preferred embodiments of this invention have been shown and described by way of illustration, many modifications will occur to those skilled in the art and it is, therefore, desired that it be understood that it is intended herein to cover all such modifications as fall within the true spirit and scope of this invention.

What is claimed as new and what it is desired to secure by Letters Patent of the United States is:

1. The combination with an elongated fishing rod having a handle and a reel end eyelet, an open face spinning reel mounted on the handle and having a drum and a rotatable line-catching assembly that includes a line distributor, and a fishline which is mounted on the drum and which normally has a helical conical path of movement between the reel end eyelet and the distributor as the line is reeled onto the drum, of an accessory which is mounted on the rod and includes an elongated finger that is movable between an inoperative position and an operative position, said finger having a hooked end portion which is offset from the path of movement of the line at the inoperative position of the finger, said end portion being located in the path of movement of the line at the operative position of the finger and thereat arranged to catch and release the line with each revolution of the distributor as the line is being reeled in.

2. The combination in accord with claim 1 where said accessory includes spring means arranged to yieldably retain said finger at each of its operating and inoperative positions.

3. The combination in accord with claim 1 where said accessory includes pivot means establishing an axis generally transverse to the longitudinal axis of the rod for pivotal movement of the finger between said inoperative position and said operative position.

4. The combination in accord with claim 1 where said accessory includes a manipulatable lever, pivot means establishing an axis, generally transverse to the longitudinal axis of the rod, for pivotal movement of the lever between a first position and a second position, spring means yieldably retaining said lever at said first position and being arranged to yieldably retain said lever at said second position, said finger being mounted in an arm of said lever and being movable between its inoperative and operative positions by pivotal movement of the lever between said first and second positions respectively.

5. The combination in accord with claim 1 where said accessory includes clamp means carrying said finger and releasably gripping said rod.

6. The combination in accord with claim 5 where said clamp means is rotatably adjustable about the longitudinal axis of the rod.

7. A fishline-catching device for attachment to an open face spinning reel equipped fishing rod having a fishline comprising; a mounting plate, means for attaching the plate to the fishing rod, an elongated finger having a hooked end fishline-engaging portion, pivot means engaging said plate and establishing an axis for pivotal movement of the finger relative to the plate and between operating and inoperative positions, and spring means for selectively retaining the finger in the operating and inoperative positions, said spring means yieldably retaining said finger in one of said positions and being arranged to yieldably retain said finger in the other of said positions said finger upon attachment of the device to the fishing rod being arranged at its operating position to be intermittently engaged by the fishline as the fishline is payed in and be nonengagable by the fishline at its operative position.

8. A fishline-catching device in accord with claim 7 further comprising lever means having a finger manipulatable arm fixed to said elongated finger and another arm, said lever means being engaged by said pivot means and being pivotally movable between first and second positions therefor to thereby pivotally move said elongated finger between its operating and inoperative positions respectively, and said spring means being connected to said mounting plate and the other arm of said lever.